United States Patent [19]

Silfvast et al.

[11] 4,395,770

[45] * Jul. 26, 1983

[54] SEGMENTED PLASMA EXCITATION-RECOMBINATION LIGHT SOURCE

[75] Inventors: William T. Silfvast, Holmdel; Leo H. Szeto, Howell, both of N.J.; Obert R. Wood, II, New York, N.Y.

[73] Assignee: Bell Telephone Laboratories, Incorporated, Murray Hill, N.J.

[*] Notice: The portion of the term of this patent subsequent to Jun. 22, 1999, has been disclaimed.

[21] Appl. No.: 367,092

[22] Filed: Apr. 9, 1982

Related U.S. Application Data

[63] Continuation-in-part of Ser. No. 82,308, Oct. 5, 1979.

[51] Int. Cl.³ .............................................. H01S 3/093
[52] U.S. Cl. ........................................ 372/62; 372/56; 372/76; 372/87
[58] Field of Search .................... 372/81, 56, 55, 76, 372/87, 62

[56] References Cited

U.S. PATENT DOCUMENTS 4,336,506  6/1982  Silfvast .................................. 372/62

Primary Examiner—William L. Sikes
Assistant Examiner—Leon Scott, Jr.
Attorney, Agent, or Firm—Michael J. Urbano

[57] ABSTRACT

An electrical signal, such as a high current pulse, is applied to a series of two or more conducting strips (101–110) installed in series in a laser cavity (150, 151) containing either a buffer gas or a vacuum. The strips are separated by small gaps. When the electrical signal is applied to the strips, plasmas (141–149) are formed in the gap regions. The plasmas are comprised of ions from the strip material. Once formed, these plasmas expand hemispherically, cool and recombine to generate radiation. The composition of the plasmas depends on the strip material, the electric field in the gaps, the gap size and the background gas type and pressure.

19 Claims, 4 Drawing Figures

SEGMENTED PLASMA EXCITATION-RECOMBINATION LIGHT SOURCE

CROSS-REFERENCE TO RELATED APPLICATION

This application is a continuation-in-part of copending application Ser. No. 82,308, entitled "Segmented Plasma Excitation-Recombination Laser", filed on Oct. 5, 1979.

BACKGROUND OF THE INVENTION

This invention relates to the field of light sources and, more particularly, to the field of plasma excitation-recombination lasers.

Applicants have demonstrated that recombination lasers can be generated in the recombining plasma of a laser-vaporized metal (Cd) by use of the relatively low energy (as low as 0.5 mJ) output of focused lasers. This work was documented in a article entitled "Recombination Lasers in Nd and $CO_2$ Laser-Produced Cadmium Plasmas", by W. T. Silfvast, L. H. Szeto and O. R. Wood II, *Optics Letters*, September 1979, Vol. 4, No. 9, pp. 271-273. This result was obtained by allowing the laser-produced plasma of the target material to expand into a low pressure background gas which provided control of the plasma expansion and increased the electron cooling rate, thereby increasing the recombination rate. Further work by applicants has indicated that segmentation of the plasma in the focal region where it is produced by cylindrical focusing is significantly more effective in generating a recombination laser in xenon gas than is the generation of the plasma by a continuous line focus. A 24-fold increase in Xe laser output was obtained for the segmented focus plasma as compared to the continuous line focus plasma for the same input energy. This increase was attributed to the larger volume of cool gas surrounding the plasmas which allowed greater plasma expansion and thereby increased the plasma recombination rate. This work was documented in an article entitled, "Ultra-High-Gain Laser-Produced Plasma Laser in Xenon Using Periodic Pumping" by W. T. Silfvast, L. H. Szeto and O. R. Wood II, *Applied Physics Letters*, Vol. 34, No. 3, Feb. 1, 1979, pp. 213-215.

SUMMARY OF THE INVENTION

An electricl signal, such as a high current pulse, is applied to a series of two or more strips installed in series in a cell containing either a buffer gas or a vacuum. At least a portion of at least one of the strips comprises a material which is vaporizable into a plasma. Typically, the material is a conductor such as a metal. The strips are separated by small gaps. When the electricl signal is applied to the strips, plasmas are formed in the gap regions. The plasmas are comprised of ions from the vaporizable strip material. Once formed, these plasmas expand, cool and recombine to generate radiation at a wavelength determined by the ions of the strip material. In turn, the composition of the plasmas depends on the vaporizable strip material, the electric field in the gaps, the gap size, and the background gas type and pressure. When the strips are installed in a laser cavity, the radiation undergoes stimulated emission and laser action results.

BRIEF DESCRIPTION OF THE DRAWINGS

A complete understanding of the present invention may be gained from a consideration of the following detailed description presented hereinbelow in connection with the accompanying drawings, in which.

DETAILED DESCRIPTION

Figure 1:
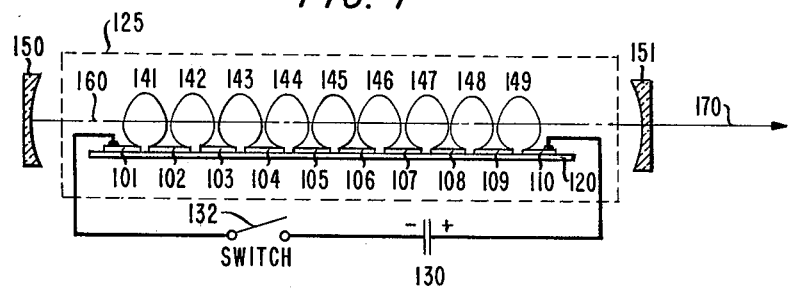
FIG. 1 shows, in schematic form, an embodiment of the present invention utilizing Cd metal strips.

An embodiment of the present invention used for the production of a segmented plasma-excitation and recombination (SPER) light source in a metal vapor is shown in FIG. 1. A plurality of metal (or metal alloy) strips 101-110 are positioned end-to-end on an electrically insulating plate 120 in such a manner as to leave a small gap between each pair of adjacent strips. A gap is defined as a spatial separation between adjacent strips large enough to allow formation of an arc between the adjacent strips under the operating conditions of the device.

This arrangement of strips is then installed in a cell 125 containing a background gas or a vacuum, preferably the former. A capacitor 130 and a switch 132 are connected in series across the first strip 101 and the last strip. The capacitor 130 is illustratively charged to a few tens of kilovolts and is then discharged across the series of metal strips with a spark gap. Operation at much lower voltages (e.g., a few tens of volts) is also possible, however, as described by W. T. Silfvast et al in a patent application to be filed. The resulting current pulse produces a bright metal vapor plasma in each gap. Areas 141-149 in FIG. 1 depict the shape of the plasmas after they have expanded approximately hemispherically outward from the gaps.

Figure 3:
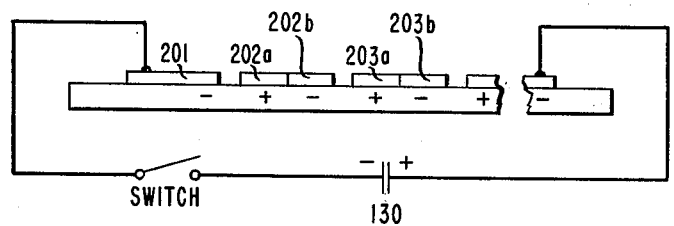
FIG. 3 is a schematic of an alternative embodiment of our invention in which the strips are bi-metallic; and, FIG. 4 is a schematic of another embodiment of our invention employing two series of strips.

Actually, the metal-vapor plasmas are provided by the negative-voltage ends of each of the strips. Thus the positive-voltage ends of each strip need not constitute a material which is vaporizable into a plasma. As shown in FIG. 3, it is sufficient if the negative-voltage ends (201, 202b, 203b, etc.) constitute a vaporizable material and that the positive-voltage ends (202a, 203a, etc.) constitute a non-vaporizable material under the operating conditions of the device. In this embodiment strips 202 and 203, for example, would comprise tandem segments (e.g., 202a and 202b) of non-vaporizable and vaporizable material electrically connected to one another. Within the scope of applications intended here, an example of a non-vaporizable material is tungsten. In addition, strips of different vaporizable materials can be mixed within a single device so as to yield a multi-color source.

Moreover, continuous wave operation is also possible as described by W. T. Silfvast et al in another patent application to be filed.

For laser operation, two dielectric spherical mirrors 150 and 151 are coated for maximum reflectivity at the desired lasing wavelength to form a resonator for the laser radiation. Illustratively, these mirrors are mounted on the ends of a tube which forms cell 125. The optical axis 160 of this resonator is positioned parallel to and slightly above the row of strips. The output from this resonator, shown as arrow 170, is focused through suitable filters onto a suitable photodetector (not shown).

Insulating plate 120 is not essential to operation of the invention. In fact, plate 120 can be eliminated without significantly affecting the light output. It does, however, function as a structural support for the electrodes and can control the direction of plasma expansion to some extent.

EXAMPLE I

The following example describes the production of a segmented plasma-excitation and recombination (SPER) laser radiation in Cd vapor using apparatus of the type shown in FIG. 1. Materials, dimensions and other parameters are given by way of illustration only and, unless otherwise stated, are not intended to limit the scope of our invention. Ten cadmium strips 101–110, each being 1 mm thick by 2 mm wide by 10 mm long, were positioned end-to-end on a 6 inch long glass plate 120 in such a manner as to leave a 1 mm gap between each pair of strips. This electrode arrangement was then installed in a gas cell 125 containing helium. Capacitor 130, 0.01 $\mu$F, was charged to 21 kV and then discharged across the series of metal strips with a spark gap. The resultant electrical signal, a 840 A current pulse, had a ringing frequency of 1.2 MHz and produced a bright cadmium metal vapor plasma in each gap.

Areas 141–149 in FIG. 1 depict the shape of the plasmas after they had expanded hemispherically outward from the gaps into the background gas of helium at 5 Torr. The areas depicted correspond to a 1 cm diameter volume. The appearance of each individual plasma was found to be similar to that produced by the focused output from pulsed Nd or $CO_2$ lasers on Cd targets. Two dielectric mirrors 150 and 151, coated for maximum reflectivity between 1.35 and 1.53 $\mu$m and having a 3 meter radius of curvature, formed a 9 inch long resonator for the 1.43 $\mu$m laser radiation. The optical axis 160 of this resonator was positioned parallel to and 7 mm above the row of cadmium strips. The output from this resonator, shown as arrow 170, was focused through suitable filters onto a room temperature Ge diode.

Using a similar arrangement to that shown in FIG. 1, we have made SPER lasers in the near infrared at wavelengths between 0.94 and 1.84 $\mu$m in the eight elements listed in Table I. The table also lists the observed wavelengths, the transition assignment, and the relative power outputs for these elements. The measured wavelengths have been identified with a transition in the neutral spectrum of the element. In every case the oscillating transitions occur between levels immediately above and below energy gaps in the excited states of the neutral species. To our knowledge laser action has not been observed before in the neutral spectra of Mg, Zn and In. Note that to produce laser oscillation in materials other than cadmium using the arrangement shown in FIG. 1, one merely replaces the cadmium strips with strips of other materials and provides the laser resonator with mirrors having high reflectivity at the appropriate wavelengths.

Figure 2:
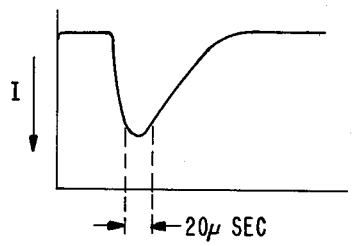
FIG. 2 shows an oscilloscope trace of 1.433 $\mu$m output from a segmented plasma recombination laser in cadmium produced by discharging a 0.01 $\mu$F capacitor initially charged to 18 kV; helium was utilized as a background gas at 3 Torr.

The 1.433 $\mu$m output from a SPER laser in cadmium produced by discharging a 0.01 $\mu$F capacitor initially charged to 18 kV in the presence of helium gas at 3 Torr pressure is shown in FIG. 2. When the rear resonator mirror 150 was removed, no radiation at or near 1.433 $\mu$m due to either spontaneous emission or stimulated emission could be detected. The onset of the 48 $\mu$sec duration laser pulse occurred long, ~40 $\mu$sec, after the 2 $\mu$sec current pulse was over. Delay times as short as 5 $\mu$sec and as long as 100 $\mu$sec have been observed under some conditions. This delay correlated well with the observation of visible spontaneous emission from highly excited levels in neutral cadmium. This delayed spontaneous emission is a characteristic feature of the plasma-recombination process as detailed in an article by applicants entitled, "Recombination Lasers in Expanding $CO_2$ Laser-Produced Plasmas of Argon, Krypton and Xenon", by W. T. Silfvast, L. H. Szeto and O. R. Wood II, *Applied Physics Letters,* Vol. 31, No. 5, Sept. 1, 1977, pp. 334–337.

The peak power of the pulse shown in FIG. 2 was not high because the active length of the device was so short. A brief attempt to measure the energy in this pulse yielded an upper limit of 50$\mu$ Joules. Hence, given a 48 $\mu$sec pulse width, the peak power must have been no more than 1 Watt. However, since the number of atoms produced per pulse was so small, discussed hereinbelow, even if every cadmium atom were initially in the upper laser level and if the resonator could extract all of the stored energy, less than 10$\mu$Joules would be expected. Therefore, at this time, the relative output power reported in the last column of Table I can only be given in terms of detector output voltage.

The dependence of laser output on helium pressure was found to vary according to the number and size of the gaps between the metal strips. For example, in a segmented plasma recombination laser in cadmium with 1 mm gaps, the optimum helium pressure, keeping the charging voltage constant, for 1 gap was 3 Torr, for 6 gaps was 7 Torr and for 12 gaps was 12 Torr. However, we have found that SPER lasers in neutral atoms have been observed to operate over a wide range of pressures from 1–100 Torr, with the preferred range being about 2–10 Torr. SPER ion lasers, on the other hand, have been found to operate over a narrower range of about 1–5 Torr, with the preferred range being about 2–3 Torr.

In this same device, even though the optimum position for the optic axis 160 of the laser resonator in this embodiment was 7 mm above the row of strips, laser oscillation could be observed anywhere in the 3 mm to 10 mm range.

A preliminary life test was conducted on a segmented plasma cadmium laser. The device to be tested was constructed of 1 mm thick by 2 mm wide by 10 mm long strips of cadmium in such a way as to have six 0.5 mm wide gaps. The apparatus was run at full power (0.01 $\mu$F capacitor charged to 21 kV) for 100,000 pulses at 2 pulses/sec with no discernible decrease in output power although the 7 Torr fill of helium gas had to be replaced occassionally.

After 100,000 pulses the device described above was dismantled and the cadmium strips were weighed. It was found that 2.1 mg per gap of cadmium had been lost during the test. This loss corresponds to approximately $10^{14}$ atoms per gap per pulse. This result when taken together with the observation of a large delay time between the current pulse and the onset of laser oscillation and the observation of laser action only on transitions that occur across energy gaps in the excited states of the neutral, makes a strong case for a population inversion mechanism based on the following plasma-recombination process: A large fraction of the cadmium atoms produced in the gaps are thought to appear initially as ions. During the volume expansion (from 1 mm$^3$ to 10$^3$ mm$^3$) plasma electrons are cooled via collisions with helium gas and as a consequence the electron-ion recombination rate is significantly increased. Because of the high electron densities present, as the cadmium ions recombine with free plasma electrons, they move downward through the high-lying neutral levels by electron collisions with other free electrons until a sufficiently large energy gap is reached. Population builds up at this bottleneck and an inversion is created with respect to lower lying levels. The resulting laser has the potential for high efficiency since all of the excitation is concentrated at the upper laser level.

EXAMPLE II

Figure 4:
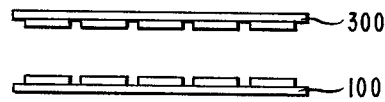

Extension of this same concept to produce laser action in other elements is possible, as in the scaling in active length and volume. For example, as shown in FIG. 4, by placing a second segmented plasma device 300 parallel to but 12 mm above the first device 100 (positioned so that the plasmas expand toward one another) the power output of a segmented plasma cadmium laser at 1.433 μm was increased by more than a factor 5. Or, by placing one 5.5 mm high glass plate on each side of a row of cadmium strips to provide some plasma confinement, the power output from a segmented plasma cadmium laser at 1.433 μm was increased by a factor of 4. In addition, it was found that increasing the number of gaps in a Cd SPER laser from 6 to 46, while keeping the input energy constant, significantly increased its gain and power output.

EXAMPLE III

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. A addition to the elements listed in Table I, we have also observed lasing in Ca, Cu, and Bi. The Ca I line was at 1.905 μm; the Cu I lines were at 1.257, 1.815, 1.818, 3.089, 3.726, and 5.460 μm; the Cu II lines were at 0.7807 and 1.787 μm; the Bi I lines were at 1.256, 1.286, and 3.107 μm; and the Bi III lines were at 0.7599 and 0.8069 μm.

EXAMPLE IV

A simple experiment was performed to demonstrate the efficacy of the embodiment of FIG. 3. A piece of cadmium was mounted on the end of a steel rod to form a bi-metallic electrode. A series of such electrodes were placed end-to-end so that at each gap the cadmium piece of one electrode faced the steel end of the adjacent electrode. When an electrical pulse was applied to the electrodes so that the cadmium pieces were at a more positive voltage than the steel rods, no plasma was formed and no radiation was emitted. However, with the voltage polarity reversed, so that the cadmium pieces were at a more negative voltage than the steel rods, a plasma of cadmium ions was produced and radiation characteristic of cadmium was observed.

TABLE I

| ELEMENT | WAVELENGTH (μm) | TRANSLATION ASSIGNMENT | POWER OUTPUT (mV) |
|---|---|---|---|
| Ag | 1.840 | 4f $^2F_{5/2}^o$ — 5d $^2D_{5/2}$ | 0.4 |
| C | 0.941 | 3p $^1D_2$ — 3s $^1P_1^o$ | 10 |
|  | 1.454 | 3p $^1P_1$ — 3s $^1P_1^o$ | 15 |
| Cd | 1.398 | 6p $^3P_2^o$ — 6s $^3S_1$ |  |
|  | 1.433 | 6p $^3P_1^o$ — 6s $^3S_1$ | 55 |
|  | 1.448 | 6p $^3P_o^o$ — 6s $^3S_1$ |  |
|  | 1.640 | 4f $^3F^o$ — 5d $^3D_1$ | 18 |
| In | 1.343 | 6p $^2P_{\frac{1}{2}}^o$ — 6s $^2S_{\frac{1}{2}}$ | 1.5 |
|  | 1.432 | 6d $^2D_{5/2}$ — 6p $^2P_{3/2}^o$ | 15 |
|  | 1.442 | 6d $^2D_{3/2}$ — 6p $^2P_{\frac{1}{2}}^o$ | 15 |
| Mg | 1.500 | 4p $^3P_2^o$ — 4s $^3S_1$ | 15 |
| Pb | 1.308 | 7d $^3F_3^o$ — 7p $^3D_2$ | 14 |
|  |  | or 7p $^3P_1$ — 7s $^3P_1^o$ |  |
|  | 1.532 | 5f $^3F_2$ — 6d $^3F_3^o$ | 4 |
|  |  | or 8s $^1P_1^o$ — 7p $^3P_1$ |  |
| Sn | 1.357 | 6p $^1P_1$ — 6s $^1P_1$ | 10 |
| Zn | 1.308 | 5p $^3P_2^o$ — 5s $^3S_1$ | 2.5 |
|  | 1.318 | 5p $^3P_1^o$ — 5s $^3S_1$ | 5 |

What is claimed is:

1. A recombination laser comprising:
a resonant laser cavity (150, 151) containing a laser medium and energy abstracting means adapted to permit egress of lasing radiation therefrom,
excitation means (130) for producing said lasing radiation in said resonant laser cavity;
said excitation means comprising at least two conductor strips (101–110) having at least one gap, which at least one gap provides at least one intervening discharge path; and means for applying an electrical signal to said at least two conductor strips; and
a cell (125) for containing a background gas and in which said at least two strips are located;
at least a portion of said at least two conductor strips being fabricated from a material which is converted into a plasma (141–149) as a result of the application of said electrical signal, which plasma cools and recombines to generate said lasing radiation (170).

2. The recombination laser as defined in claim 1 which further includes a background buffer gas.

3. The recombination laser as defined in claim 2 wherein said background buffer gas is helium.

4. The recombination laser as defined in claim 3 wherein said portion comprises silver.

5. The recombination laser as defined in claim 3 wherein said portion comprises cadmium.

6. The recombination laser as defined in claim 3 wherein said portion comprises carbon.

7. The recombination laser as defined in claim 3 wherein said portion comprises indium.

8. The recombination laser as defined in claim 3 wherein said portion comprises magnesium.

9. The recombination laser as defined in claim 3 wherein said portion comprises lead.

10. The recombination laser as defined in claim 3 wherein said portion comprises tin.

11. The recombination laser as defined in claim 3 wherein said portion comprises zinc.

12. The recombination laser as defined in claim 3 wherein said portion comprises calcium.

13. The recombination laser as defined in claim 3 wherein said portion comprises copper.

14. The recombination laser as defined in claim 3 wherein said portion comprises bismuth.

15. The recombination laser of claim 1 wherein the entirety of each of said strips comprises said material.

16. The recombination laser of claim 1 wherein said applying means includes means for applying a voltage across said strips and wherein said at least one portion has a more negative voltage applied to it.

17. The recombination laser of claim 16 wherein at least one of said strips comprises electrically connected first and second portions, said first portions comprising said material and having a negative voltage applied thereto and said second portions comprising another material from which no plasma forms and to which a positive voltage is applied.

18. The recombination laser of claim 1 wherein said excitation means further includes at least two other strips arranged so as to form a second plasma which expands toward said first plasma.

19. A recombination plasma light source comprising:
excitation means for producing radiation;
said excitation means comprising at least two electrodes having at least one gap, which at least one gap provides at least one intervening discharge path; and means for applying an electrical signal to said at least two electrodes;
at least a portion of said at least two electrodes being fabricated from a material which is converted into a plasma as a result of the application of said electrical signal, which plasma cools and recombines to generate said radiation.

* * * * *